(12) United States Patent
Kam et al.

(10) Patent No.: US 11,184,367 B2
(45) Date of Patent: Nov. 23, 2021

(54) APPLYING BLOCKCHAIN TO A SENSOR TRACKER

(71) Applicant: LOCKHEED MARTIN CORPORATION, Bethesda, MD (US)

(72) Inventors: Ambrose Kam, Westampton, NJ (US); Hiren Patel, Mount Laurel, NJ (US); Alexander Richard Vesey, Patton, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 30 days.

(21) Appl. No.: 16/853,915

(22) Filed: Apr. 21, 2020

(65) Prior Publication Data

US 2021/0329006 A1 Oct. 21, 2021

(51) Int. Cl.
*H04L 29/06* (2006.01)
*H04L 12/46* (2006.01)
*H04L 29/08* (2006.01)
*H04L 9/06* (2006.01)

(52) U.S. Cl.
CPC .......... *H04L 63/123* (2013.01); *H04L 9/0643* (2013.01); *H04L 12/46* (2013.01); *H04L 63/0428* (2013.01); *H04L 67/10* (2013.01); *H04L 67/12* (2013.01); *H04L 63/1466* (2013.01); *H04L 63/1483* (2013.01); *H04L 2209/38* (2013.01)

(58) Field of Classification Search
CPC ..... H04L 63/123; H04L 9/0643; H04L 12/46; H04L 63/0428; H04L 67/10; H04L 67/12; H04L 63/1466; H04L 63/1483; H04L 2209/38

See application file for complete search history.

(56) References Cited

U.S. PATENT DOCUMENTS

| | | | |
|---|---|---|---|
| 9,667,427 | B2 | 5/2017 | Oberhauser et al. |
| 9,749,140 | B2 | 8/2017 | Oberhauser et al. |
| 9,935,772 | B1 | 4/2018 | Madisetti et al. |
| 10,084,600 | B1 | 9/2018 | Irwan et al. |
| 10,102,526 | B1 | 10/2018 | Madisetti et al. |
| 10,104,077 | B1 | 10/2018 | Irwan et al. |
| 10,121,143 | B1 | 11/2018 | Madisetti et al. |
| 10,204,339 | B2 | 2/2019 | Madisetti et al. |
| 10,255,458 | B2 | 4/2019 | Aunger et al. |

(Continued)

*Primary Examiner* — Arvin Eskandarnia
(74) *Attorney, Agent, or Firm* — Michael Best & Friedrich LLP

(57) ABSTRACT

A method and a computer network of interconnected computer nodes, one assigned a role of a deployer node, the deployer node creating and executing a rule-based block, and assigning others of the computer nodes a role of sensor node or a role of display node. The deployer node maintains addresses of the sensor nodes and the display nodes, the sensor nodes add sensor track data to create linked blocks, and the display nodes read the sensor track data in the linked blocks. The rule-based block includes a sensor add rule which checks that only computer nodes assigned the role of the deployer node can assign a computer node the role of sensor node. The rule-based block includes a sensor track data add rule which checks that only the computer nodes assigned the role of sensor node can request to add new sensor track data to create the linked blocks.

20 Claims, 15 Drawing Sheets

(56) References Cited

U.S. PATENT DOCUMENTS

2006/0036390 A1* 2/2006 Loh .................... G01R 31/2834
702/117
2014/0108506 A1* 4/2014 Borzycki ............ H04L 67/1095
709/203

* cited by examiner

FIG. 13

APPLYING BLOCKCHAIN TO A SENSOR TRACKER

BACKGROUND

Technical Field

The present disclosure is directed to a secure distributed sensor tracking system and method having preapproved nodes.

Description of the Related Art

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art.

In the arena of cybersecurity, even a seemingly isolated ocean surface platform may be a subject of many types of cyber-attacks. An attacker may actively target exploitation of weaknesses, limitations, and assumptions in mechanisms a target utilizes to manage identity and authentication. Such exploitation can lead to subversion (e.g., complete subversion) of any trust the target system may have in the identity of any entity with which it interacts. Weaknesses targeted by these sorts of attack may be due to assumptions and overconfidence in the strength or rigor of the implemented authentication mechanisms.

An attacker may focus on the gathering, collection, and/or theft of information. The attacker may collect this information through a variety of methods including active querying as well as passive observation. Information retrieved may aid the attacker in making inferences about potential weaknesses, vulnerabilities, or techniques that assist the attacker's objectives. This sort of attack may be undertaken in preparation for some other type of attack, although the collection of information by itself may in some cases be the end goal of the attacker.

Phishing is a practice of sending email messages purporting to be from reputable allies in order to induce individuals to reveal confidential information, such as passwords. Phishing is a widely used cyber attack and may be used even in the case of an ocean surface platform.

Supply chain security threats may take the form of vulnerabilities in software applications and networks, or malware that is inserted into software or hardware, and pose a threat in a complicated platform. Supply chain threats are possible in a complicated ocean surface platform that involves components from hundreds of vendors. Insider threats, such as a USB drive with malicious software, are difficult to prevent.

Further, an attacker may focus on malicious interactions with a target in an attempt to deceive the target and convince the target that it is interacting with some other principal and as such, take actions based on the level of trust that exists between the target and the other principal. These types of attacks, often identified by the term "spoofing," rely on the falsification of the content and/or identity in such a way that the target will incorrectly trust the legitimacy of the content.

Spoofing is particularly of concern due to the potential harm that an attacker may be able to do to a component like a radar tracker which can hold vital target tracking information. On an ocean surface platform, for example, allowing the attacker to spoof the radar tracks not only degrades the probability of kill (Pk of interceptor), but if spoofing causes corruption of target classification and identification, it could mean leakers (threatening ownship's survivability), or worst, it could lead to a fratricide situation, where an interceptor is fired at an identity mistaken friendly target.

A sensor-based tracking system, or simply a sensor tracker such as a radar tracker, is essentially a node that maintains a database of track data obtained by the sensor. Sensor-based tracking systems may include one or more radar systems and other types of sensors to identify, detect, and track multiple targets at a time. The identification, detection, and tracking data obtained from the radar systems and other sensors may be combined and inserted into track reports. For example, the location of the target, kinematic information like speed, acceleration and heading information, type of target, and classification of target may be included in the track reports. The rate of reception of sensor data and report generation may occur at a relatively high frequency. Platforms equipped with computer-controlled radar and other sensor systems may share sensor data with other platforms.

Radar systems, in particular, may detect and track targets at various ranges and may be part of different operational environments. For example, radar systems may be 2-D or 3-D, computer controlled, and mounted on surface ships. A particular 3-D radar for a surface ship may have a range of over 100 nautical miles and be controlled by a computer. For example, the particular 3-D radar may track approximately 800 targets simultaneously. The targets may be stationary and/or moving and may be land based, surface ships, submarine, or aircraft. A type of radar system for ground based platforms is a long range discrimination radar.

Other types of sensor systems may be deployed on ground vehicles and fixed and rotary wing platforms. Electro-optical/infrared type sensor systems may provide targeting, navigation, detection, and surveillance capabilities. Space-based sensor systems may collect and transmit imagery and other sensor data. Space-based infrared surveillance may track targets based on infrared data.

In order to ensure that the data in track reports are not lost or compromised, typically the report data is stored in a primary database and a second standby database. FIG. 1 is a diagram showing database failover. During normal operation S101, each data item received and stored in a primary database 110 will be stored, by an observer entity 130, in a standby database 120, such that the standby database 120 is maintained as a redundant database. The observer entity 130 ensures that a database instance in the primary database 110 is also maintained in the standby database 120. In the case of failure or abnormal termination of the primary database 110, in S103, an automatic failover operation will switch to the redundant standby database 120. In particular, in the case of a failover event, the observer entity 130 is provided a view of the database instance by way of the standby database 120. At some future point, in S105, the standby database 120 will reconnect with the primary database 110, and the observer entity 130 will re-establish maintenance of the standby database 120 based on data stored in the primary database 110.

On certain types of platforms, the assumption that the primary database is incorruptible due to maintenance of a standby database may not be sound. For example, in a surface ship environment, both tracker report databases reside within the same ship hull, on the same network, for instance. Subsequently, this database setup is essentially 2 single points of failure. Additional techniques including data encryption and hash comparison (data digesting), by themselves, may only help to a degree. Hence, it is possible to corrupt both databases.

Further, it is possible for adversaries to tap into this radar and sensor data and computer systems that maintain the data and use the data for their own operations. For example, sensor trackers that maintain the radar and sensor data may be compromised by rainbow password hack techniques. In another example, malware may be used to attack a database. The malware may steal user credentials, spoof data, or insert false data into the database. For example, sensor tracks may be spoofed by inserting inconsistent false errors for target locations.

Sharing data with other platforms can enable unfriendly platforms to share data and may make it difficult to distinguish friendly from unfriendly sources. For example, identification friend or foe (commonly referred to as IFF) data may be compromised in a manner that a previously known foe tracks become shown as friendly. As another example, hostile air tracks may be miss-classified as surface tracks.

Spoofing is a fraudulent or malicious practice in which communication is sent from an unknown source disguised as a source known to the receiver. Malicious interactions with a target may be made in an attempt to deceive the target and convince the target that it is interacting with some other principal and, as such, take actions based on the level of trust that exists between the target and the other principal. These types of attacks rely on the falsification of the content and/or identity in such a way that the target will incorrectly trust the legitimacy of the content.

There is a need for a network that obtains data from radar and sensors in a secure manner that prevents the data from being provided to unfriendly platforms and that distinguishes friendly from unfriendly participants in a network environment.

SUMMARY

In an exemplary embodiment, a computer network of interconnected computer nodes, including a plurality of the interconnected computer nodes can be provided or implemented. One of the computer nodes is assigned a role of a deployer node, the deployer node being configured to create and execute a rule-based block and to assign other of the computer nodes a role of sensor node or a role of display node. The deployer node maintains addresses of the sensor nodes and the display nodes. The computer nodes assigned the role of the sensor node are configured to add sensor track data to create linked blocks. The computer nodes assigned the role of display node are configured to read the sensor track data in the linked blocks. The rule-based block includes a sensor add rule which when executed checks that only the computer node assigned the role of the deployer node is able to assign the role of sensor node to said other of the computer nodes. The rule-based block includes a sensor track data add rule which when executed checks that only each of the computer node or nodes assigned the role of sensor node is able to request to add new sensor track data to create the linked blocks.

In another exemplary embodiment, a method in a computer network of interconnected computer nodes can be implemented. The method can include assigning one of the computer nodes a role of a deployer node; creating, by the deployer node, a rule-based block; assigning, by the deployer node, others of the computer nodes a role of sensor node or a role of display node; storing, by the deployer node, addresses of the sensor nodes and the display nodes; adding, by the sensor nodes, sensor track data to create linked blocks; reading, by the display nodes, the sensor track data in the linked blocks; checking, by execution of a sensor add rule of the rule-based block, that only the computer node assigned the role of the deployer node is able to assign the role of sensor node to said others of the computer nodes; and checking, by execution of a track data add rule of the rule-based block, that only each of the computer node or nodes assigned the role of sensor node is able to request to add new sensor track data to create the linked blocks.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 13 is an exemplary display interface for a discovered spoofing attempt in accordance with an exemplary aspect of the disclosure.

DETAILED DESCRIPTION

Figure 1:
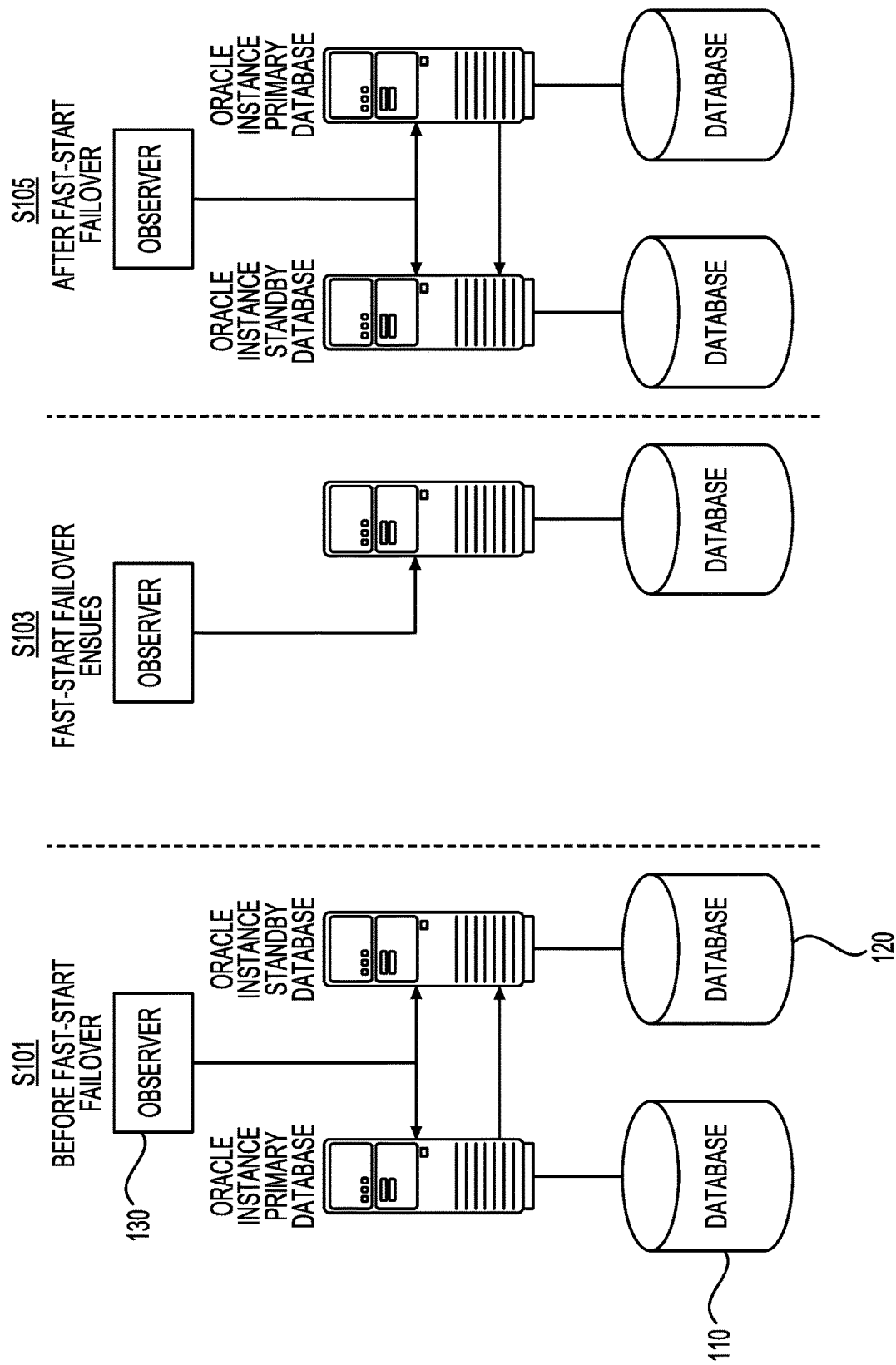
FIG. 1 is a diagram showing database failover.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to a sensor tracking system and/or method (hereinafter sensor tracking system) implemented using a secure distributed ledger, in particular, a blockchain. Sensor tracking according to embodiments of the disclosed subject matter can be permission-based, in that participation in the distributed ledger requires permission and nodes granted permission may be allowed to contribute, for example by adding blocks, to a distributed tracking blockchain. Particular levels of permission are granted to nodes through the assignment of roles to each participant node, where the role dictates the types of actions a node may perform.

Data security can be critical to a sensor tracking system. For example, as mentioned above, spoofed sensor track data may be detrimental to a sensor tracking system. While cyber protection may exist at the network layers of a sensor tracker, there is typically minimal security at the application and data layers.

Distributed Ledger Technology involves tamper evident and tamper resistant digital ledgers implemented in a distributed fashion (i.e., without a central repository). A blockchain is a distributed ledger structured as a chain of linked blocks. In particular, a blockchain is essentially a distributed database with a list (or a "chain") of blocks linked and secured by digital fingerprints (that is, crypto hashes). Distributed Ledger Technology provides a way of recording transactions or any digital interaction in a way that is secure, transparent, highly resistant to outages, auditable, and efficient. In disclosed embodiments, a blockchain is used to store sensor track data. Hereinafter, the sensor tracker will be described with regard to the terms Blockchain Technology, Blockchain Network, and Blockchain.

Since a radar tracker uses a database, maintaining data consistency, and guaranteeing integrity, can be crucial. Data encryption and hash comparison (data digesting), by themselves, may only help to a degree, so a broader approach is needed. Blockchain Technology can potentially mitigate the cyber risks on a single platform. With Blockchain Technology, any new transaction added to a Blockchain will result in the change of the global state of the all ledgers, and the previous state will be stored. Hence, the Blockchain provides a fully traceable history log. Provided these features, Blockchain Technology provides a trusting environment that the transactions stored on the tamper-proof Blockchain are valid. The combination of sequential hashing and cryptography along with its decentralized structure makes it very challenging for any hacker to tamper with the Blockchain, in contrast to a standard standalone database configuration.

On a typical ocean platform, there may be several hundred network nodes, and if each of the network nodes can be granted permission to participate in a Blockchain Network, Blockchain Technology may be exponentially more secure than a single-point-of-failure database setup. As a practical matter, from the attacker's standpoint, the only known way to defeat a blockchain scheme is to change more than the majority of the ledgers within the network at the same time without being detected (commonly referred to as the 51% attack rule). The probability of that happening is very small due to complete transparency nature of Blockchain Technology. Hence, target track data integrity and consistency may be preserved.

Figure 2:
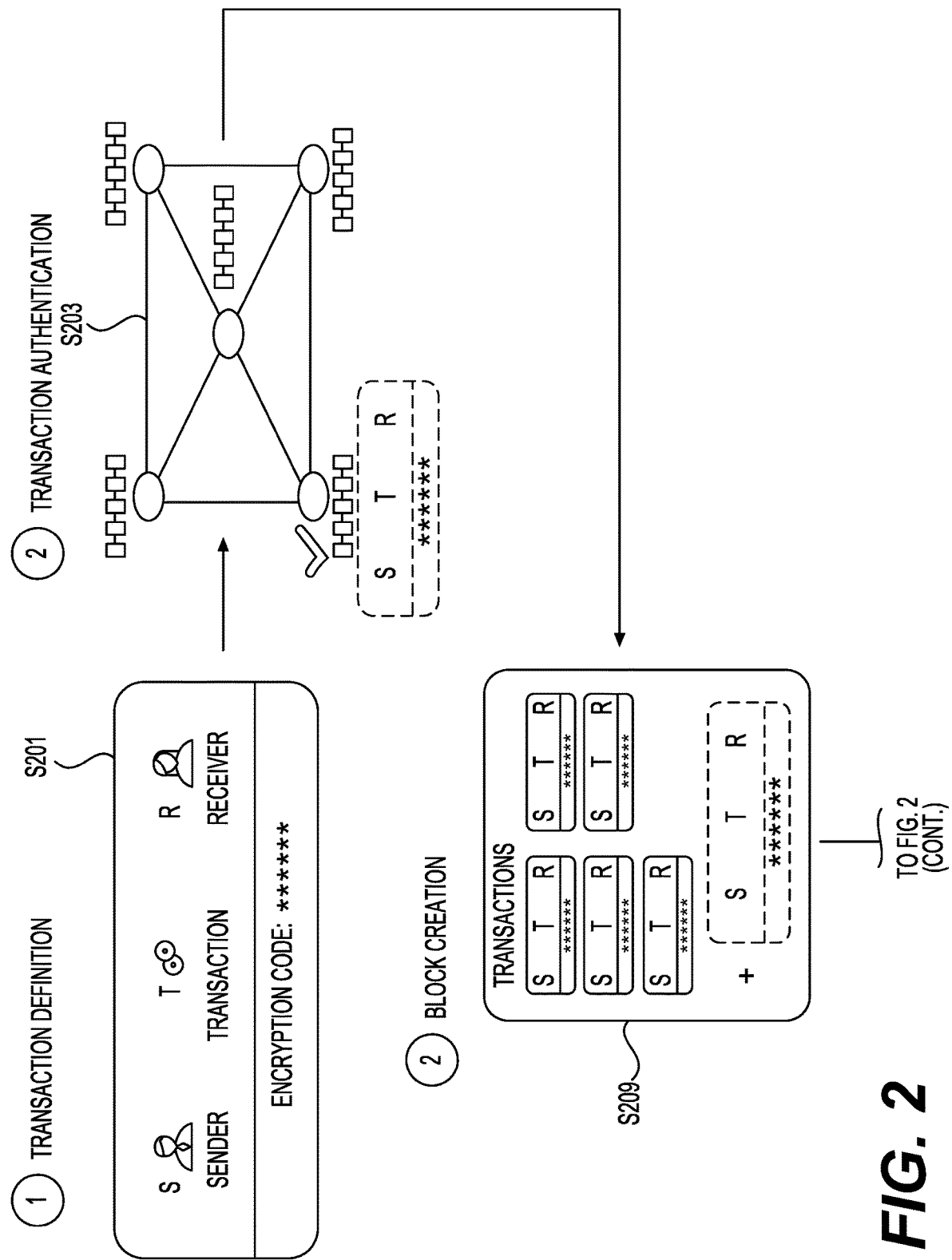
FIG. 2 is a diagram of Distributed Ledger Technology.
Figure 2:
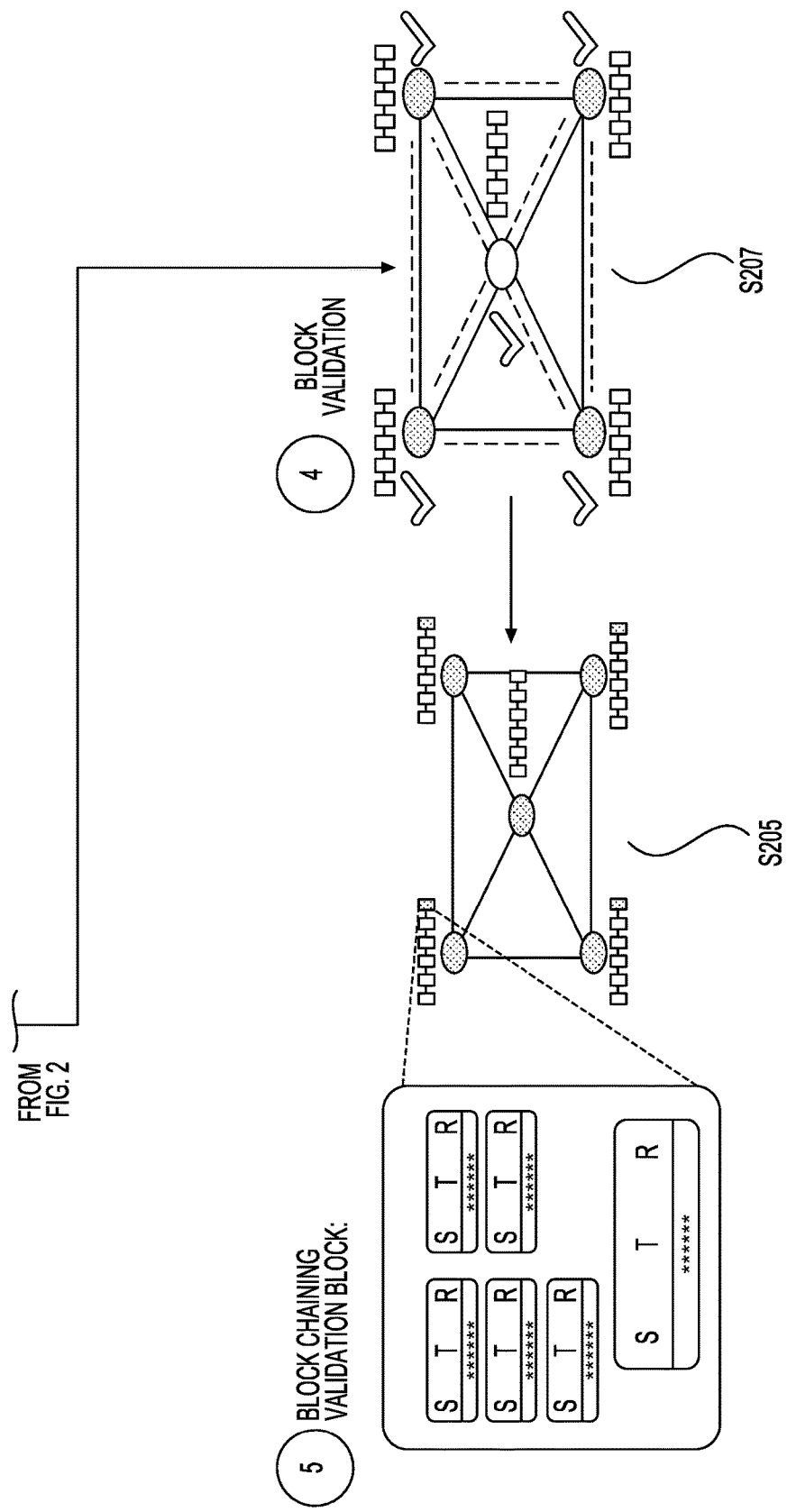

FIG. 2 is a diagram of basic blockchain operations. Initial blockchain operations may be conducted at a node, which is a computer system that is a member of a Blockchain Network. In S201, a transaction may be performed in a node that is defined by transaction data, sender, receiver, and encrypted transaction data. In S203, the node may conduct a transaction authentication process to authenticate the transaction. In S209, the node may assemble one or more authenticated transactions into a block, where a block is a data structure.

In S207, the node may broadcast the block to other nodes in order to undergo a consensus process using a consensus algorithm. There are two main types of consensus algorithms that have been developed. The two types are Proof of Work or Proof of Stake. The Proof-of-Work algorithm is used to achieve a consensus in order to add new blocks to the chain. In Proof-of-Work, miners (which may be nodes in a Blockchain Network) compete against each other to arrange blocks. In practice, miners solve a complicated mathematical puzzle such as a hash function to determine a hash. The Proof-of-Stake algorithm is also used to add new blocks to the chain. Proof-of-Stake does not use mining and instead the creator of the next block is chosen by various combinations of random selection, wealth or entity age, such as a coin age, which is the stake. The consensus algorithm typically includes a process of arranging the data for the new block. In S205, when a consensus performed by the nodes has made a determination that a block is valid, the node may add the validated block to a Blockchain and distribute the updated Blockchain to all nodes in the Blockchain Network.

The disclosed subject matter, including specific embodiments thereof, leverage Blockchain Technology's distributed architecture to enhance data protection. The disclosed embodiments provide a permission-oriented Blockchain Network that combines network scalability with node validation capabilities.

Figure 3:
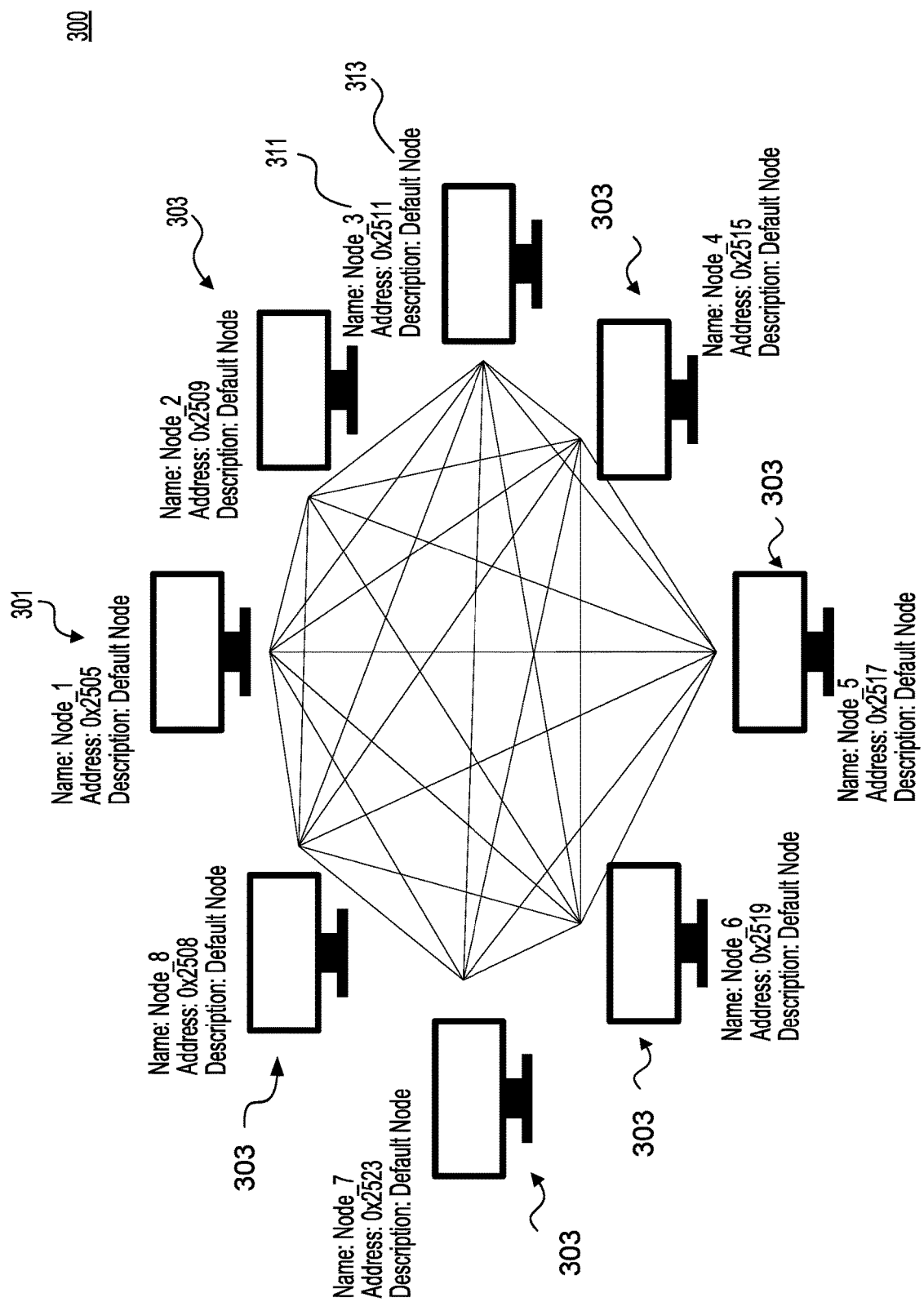
FIG. 3 is a network diagram for a Blockchain.

FIG. 3 is a network diagram for a Blockchain Network system 300. A computer network that performs blockchain operations may consist of tens or hundreds or thousands of distributed nodes 303. In this disclosure, a "node" may also be referred to as a "computer node," and each computer node includes circuitry to perform functions set forth in a computer program. In an embodiment, a node has as a minimum, an IP address, an operating system, central processing unit, program memory, e.g., RAM, and network communications capability. Regarding FIG. 3, each node has an IP address 313 for communication with other nodes in the network. The addresses may be built-in addresses, or addresses that are assigned by a network administrator. For purposes of identification, each node may have a unique identifier 311, which may be a name or a number, or a combination of both. A node may be assigned a role, for example, a sensor. A Deployer node 301 may be assigned a role of deploying a smart contract for a Blockchain.

In some embodiments, enhancements may be made to ensure processing time constraints are met for the Blockchain Network system 300. It has been determined that the additional information overhead of a blockchain header does not substantially slow down network throughput rate. For example, the additional processing time has been observed to be on the order of a few milliseconds. In order to speed up processing time to make up for any processing of overhead due to added blockchain header information, nodes may be upgraded to include more computational power and increase the amount of program memory (e.g., RAM).

Figure 4:
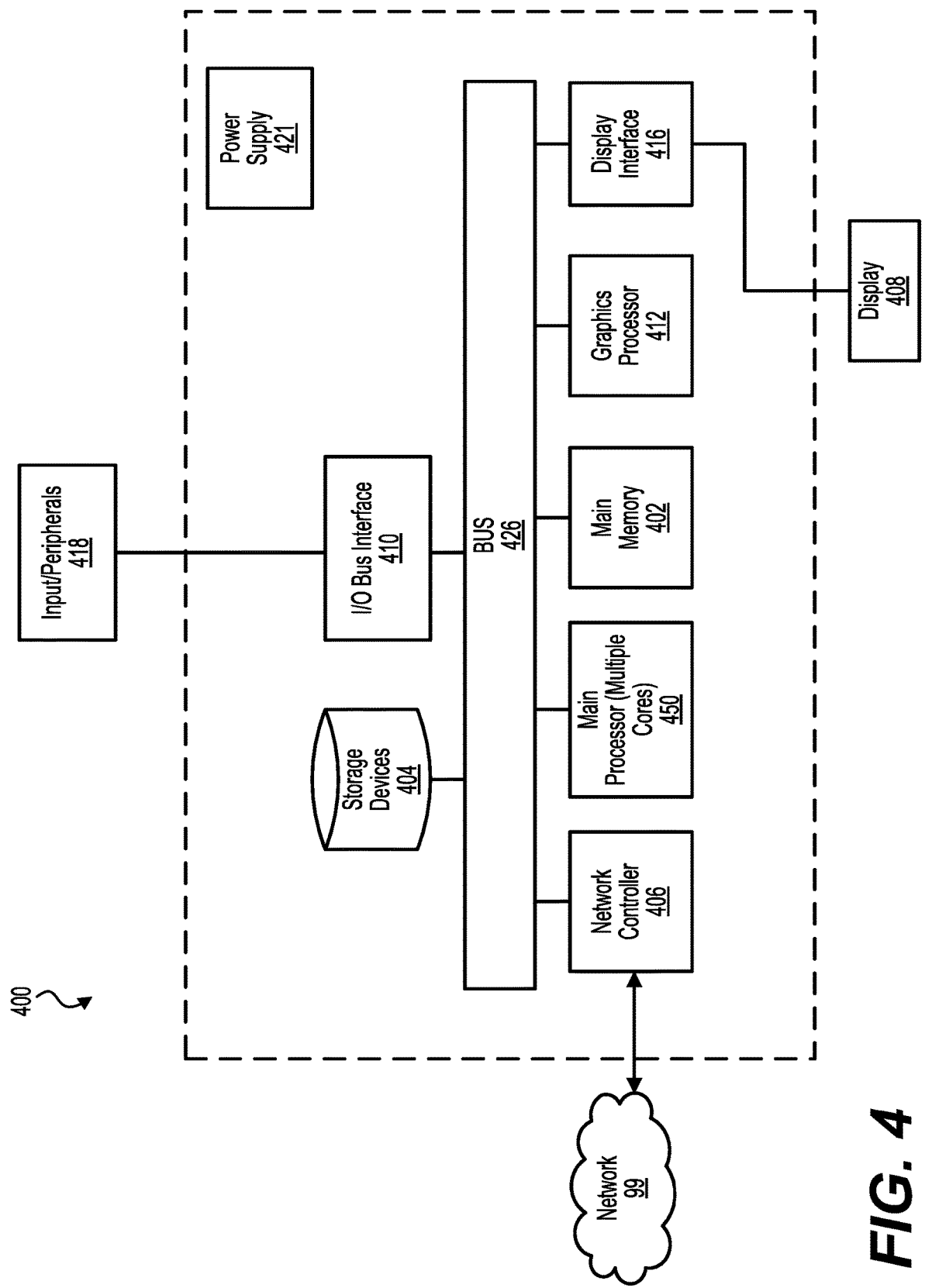
FIG. 4 is a block diagram of a computer system for a node.

FIG. 4 is a block diagram illustrating an exemplary computer system 400 for a computer node of a Blockchain Network according to embodiments of the disclosed subject matter. In some embodiments, a node may be a smartphone, a radar element, an aircraft control element, or a satellite ground control, as well as an ocean-based platform computer system. The computer system 400 may be a server or workstation running a server operating system, for example Windows Server, a version of Unix OS, or Mac OS Server. However, the computer system 400 may be any computer device configured with minimum hardware to run blockchain-related software, including a smart contract, a blockchain consensus algorithm, and hash functions, and store blockchain-related data including a ledger or blockchain. The computer system 400 may include circuitry implementing one or more processing cores 450 and one or more graphics processors 412. The graphics processor 412 may perform many of the mathematical operations of the proof of work algorithm, performing a hash function, and other blockchain functions performed in a node. The computer system 400 includes main memory 402, typically random access memory (RAM), which contains the software being executed by the processing cores 450 and graphics processor(s) 412, as well as a non-volatile storage device 404 for storing the blockchain data and blockchain-related software programs. Several interfaces for interacting with the computer system 400 may be provided, including an I/O bus interface 410, input/peripherals 418 (e.g., keyboard, touch pad, mouse, etc.), and a display interface 416, along with one or more displays 408 and a network controller 406 to enable wired or wireless communication through a network 99. The interfaces, memory, and processors may communicate over the system bus 426. The computer system 400 can include a power supply 421, which may be a redundant power supply.

Figure 5A:
FIG. 5A is an exemplary data structure for a smart contract, in accordance with an exemplary aspect of the disclosure.
Figure 5B:
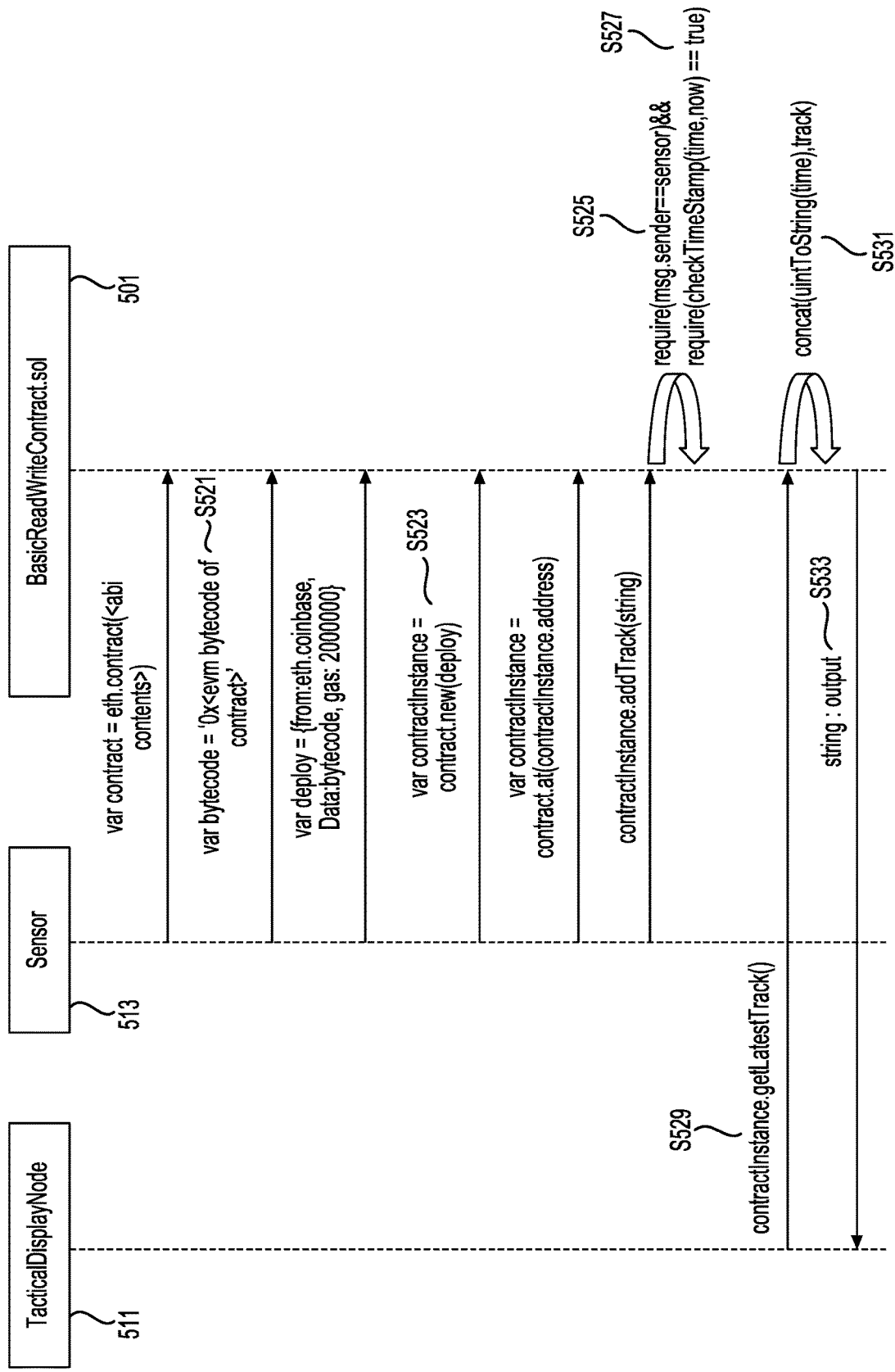
FIG. 5B is a sequence diagram for setting up a sensor tracking system, in accordance with an exemplary aspect of the disclosure.

FIG. 5A is an exemplary data structure for a smart contract 501. In some embodiments, the smart contract 501 is maintained in at least one computer node 301, 303. FIG. 5B is a sequence diagram for initially setting up a sensor tracking Blockchain Network. One or more initial blocks in a new Blockchain may contain the smart contract 501. The smart contract 501 generally specifies rules of operation for maintenance of a Blockchain. The smart contract 501 may initialize sensor node controls and regulate messages passed between nodes. As mentioned above, computer nodes may be assigned roles that may perform specific actions based on the assigned role. The types of roles that computer nodes in a computer network may be assigned may include a Tactical Display node 511 and a Sensor node 513.

The Sensor node 513 is a computer node that may be granted permission to send a message S521 for an action of deploying a new contract and may include sending an address, in S523, of the receiving smart contract. The Sensor node 513 may be granted permission to send a message S525 to the address of a receiving smart contract to add sensor track data, which parses the input data and structures it into the format used by the smart contract's track database which may be maintained in the Deployer node 301. In some embodiments, the function of adding sensor track data may require, in S527, that the message be sent from a Sensor node 513 whose assigned role allows adding sensor track data and may require a time stamp be a current time stamp.

The Tactical Display node 511 is a computer node that may send a message S529 to the address of the smart contract get the latest sensor track data, which returns, in S531, the last sensor track data added to the smart contract's database. In S533, the last sensor track data added to the smart contract's database is sent from the address of the smart contract to the Tactical Display node 511.

Figure 6:
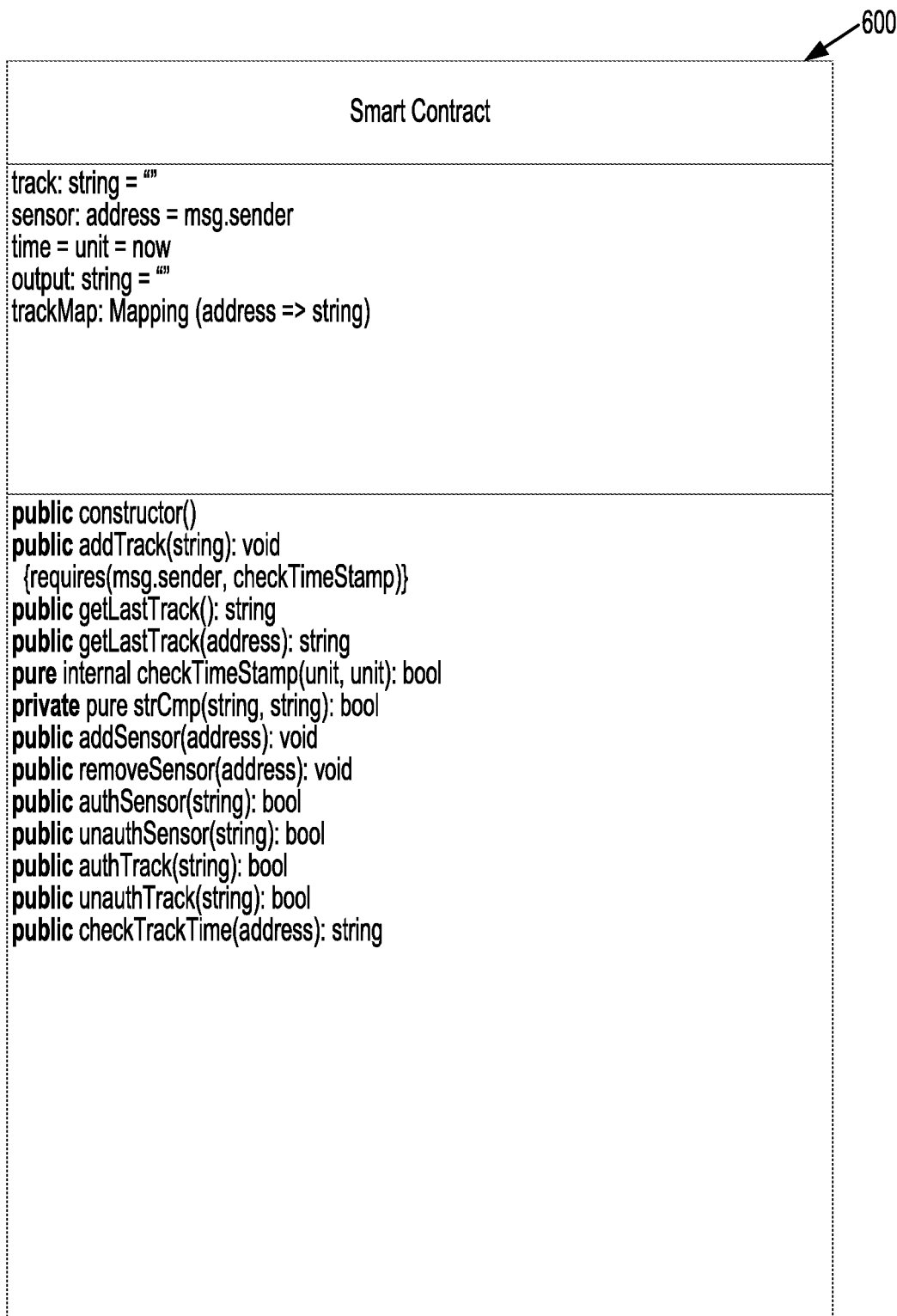
FIG. 6 is an exemplary diagram of a smart contract structure in accordance with an exemplary aspect of the disclosure.

FIG. 6 is an exemplary diagram of specific data items and functions that may be incorporated into a smart contract data structure. The smart contract 600 in FIG. 6 illustrates some specific data items and functions, but is not limited to those shown. The smart contract 600 is a block in the form of a data structure that holds data items and function definitions, i.e., rules that govern the management of the Blockchain. The smart contract 600 may store data items including a sensor track, a sensor address, time, output, and track map. A "track map" is a database that holds track reports.

The smart contract 600 in FIG. 6 includes several exemplary functions. A smart contract 600 may include additional functions for other types of messages and nodes in addition to sensor nodes. A constructor function is called when the smart contract 600 deploys and sets a Deployer node 301 to be the address deploying the smart contract 600. The Deployer node 301 is a computer node that has been assigned a role as a deployer. The constructor function also adds the Deployer node 301 to a track map with a track 'constructor' to avoid not initializing the track map before use. The add Track function takes in a string of sensor data and saves the string to contract storage of the smart contract 600. The get Latest Track function returns a track variable and a time of the block that the sensor track data was saved in at a caller address or the address specified. The check Time Stamp function compares the current variable value (i.e., the time of the new block at which the transaction will go on) to the time stamp of the last track. If the last track is <=current value, the track is rejected as a possible replay attack. The add Sensor function allows the Deployer node 301 to add a sensor to the track mapping, allowing the address of the added sensor to call the add Track function. The add Track function parses the input data and structures the input data into the format used by the smart contract's 600 track database. The string Compare function (depicted in FIG. 6 as strCmp) checks the hash of the bytes of two strings for equality.

The authorized Sensor function takes as input an address of a sensor to add and the Deployer node 301 address and checks against the list of deployers. The unauthorized Sensor function takes as input an address of a sensor to add and the Deployer node 301 address and checks against the list of deployers. The unauthorized Sensor function logs an alert if the Deployer node 301 address is not authorized. The authorized Track function takes as input a track to add and the sensor address who is reporting the track to add and checks against the list of known sensors. The unauthorized Track function takes as input a track to add and the sensor address who is reporting the track to add and checks against the list of known sensors. The unauthorized Track function logs an alert if the sensor address is not authorized. The check Track Time function does conversions to get the time that a particular track was added to the track database. The check Track Time function takes as input a track and returns the time.

Figure 7:
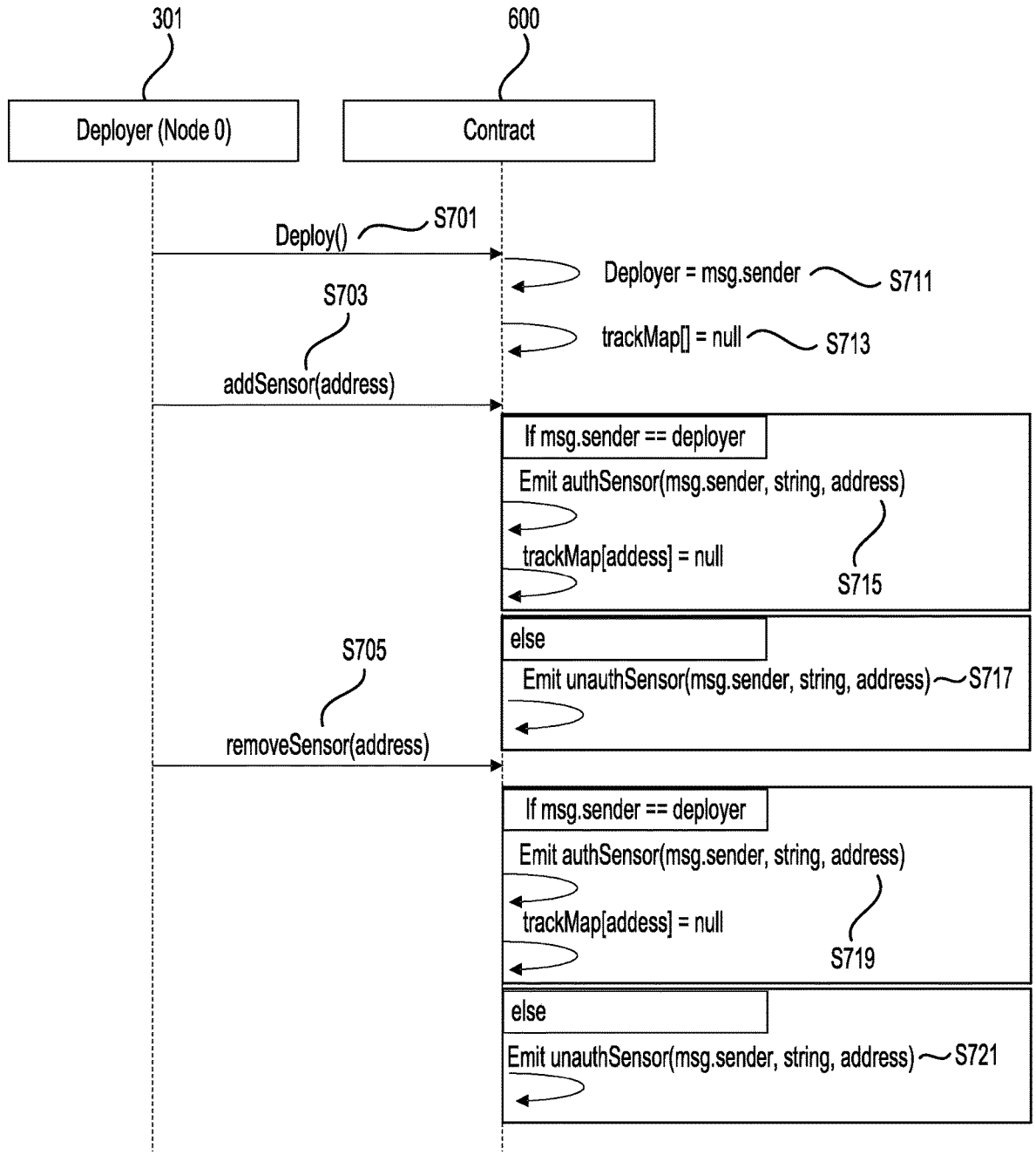
FIG. 7 is a sequence diagram for adding a sensor node in a sensor tracking system in accordance with an exemplary aspect of the disclosure.

FIG. 7 is a sequence diagram for adding a sensor node in a sensor tracking system according to embodiments of the disclosed subject matter. In some embodiments, only a computer node that has been assigned the role of a Deployer node 301 may add or remove a Sensor node 513 with respect to the Blockchain Network. The Deployer node 301 adds and removes sensor nodes 513 in accordance with functions (rules) in the smart contract 600. A Deployer node 301 may be determined when a Blockchain Network is initially set up. A Deployer node 301 is preferably protected from network and host level attacks.

Initially, in S701, the Deployer node 301 establishes communication with a smart contract 600. Upon receiving the deploy message from the Deployer node 301, in S711, the smart contract 600 may be installed in memory of the Deployer node 301 as a block in the Blockchain, and, in S713, a track map may be established. Messages sent by Deployer node 301 for performing operations associated with adding and removing nodes that can perform as sensor nodes 513 may include an add sensor message, in S703, and a remove sensor message S705.

In some embodiments, the smart contract 600 may be created and deployed by the Deployer node 301 as a first block in a Blockchain. The Deployer node 301 may configure the smart contract 600 with a rule to determine whether the node to be added as a Sensor node 513 has an IP address 313 that has been registered with the Blockchain Network. If the Sensor node 513 has an IP address that has been registered, in S715, Deployer node 301 may add the node as an authorized Sensor node 513. Otherwise, in S717, if the node to be added as a Sensor node 513 has an IP address that is not in a list of registered nodes, the node will be considered as an unauthorized node. A node that is authorized as a Sensor node 513 may begin tracking and adding track records to the Blockchain.

The Deployer node 301 may be sent a message from the smart contract 600 based on execution of a function of the smart contract 600 informing that the request to add a Sensor node 513 has been authorized or not. In a similar manner, only nodes that are registered may be removed as a Sensor node 513. Again, the Deployer node 301 may be informed via a message from the smart contract 600 whether the Sensor node 303 has been removed, in S719, or is an unauthorized node in S721.

Figure 8:
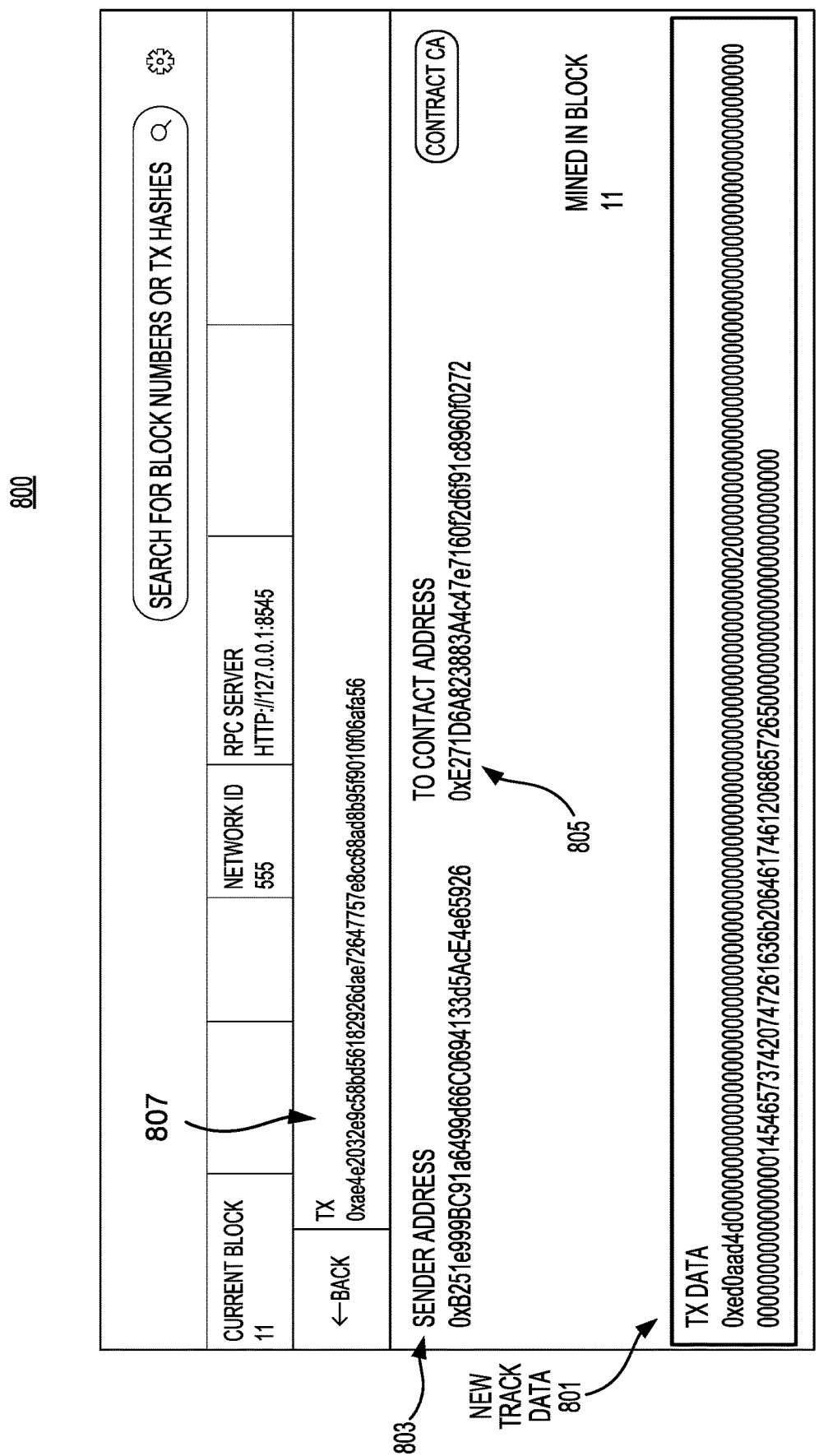
FIG. 8 is an exemplary display interface showing an example request to insert a new block in accordance with an exemplary aspect of the disclosure.
Figure 9:
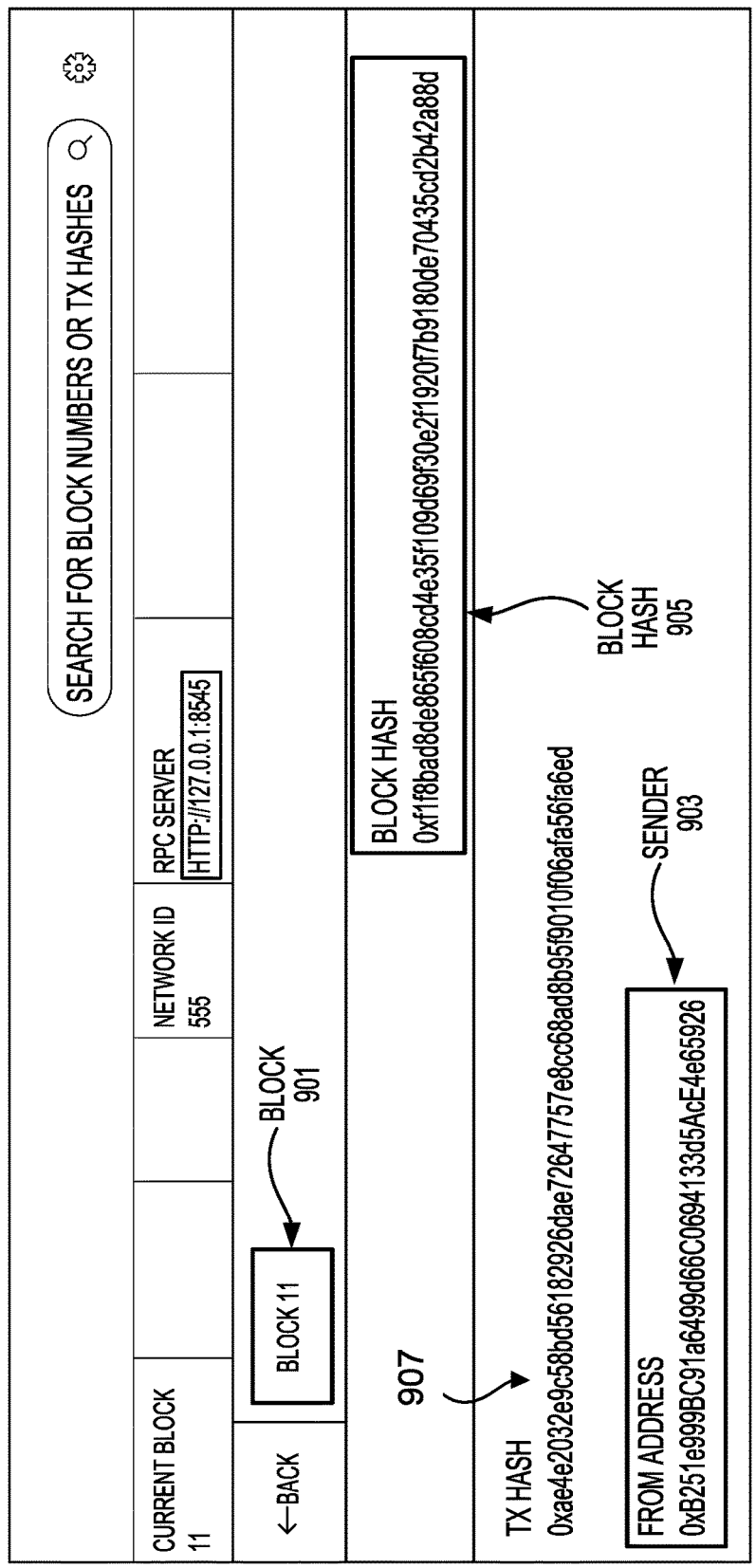
FIG. 9 is an exemplary display interface showing an example new block in accordance with an exemplary aspect of the disclosure.

The Blockchain may be implemented using a platform for blockchain-based application development. Some blockchain platforms include Ethereum, Hyperledger, R3, Ripple, EOS, OpenChain, to name a few. FIG. 8 is an exemplary display interface 800 showing an example record for adding a new block to be inserted into a Blockchain. FIG. 9 is an exemplary display interface 900 showing an example of a block that has been inserted into the Blockchain.

A computer node, e.g., Sensor node 513, may request to have a new block inserted by sending a message, the contents which are shown in display interface 800. A message, such as in FIG. 8, is for a transaction and includes a transaction hash TX 807. The message includes transaction-related data including new sensor track data 801, the address of the sender 803 (e.g., a Sensor node 513), and the address 805 of the smart contract 600. The sender address 803, the smart contract address 805, and the new sensor track data 801 may each be encrypted. Regarding FIG. 9, once created, the new block, the contents of which are shown in display interface 900, may include a block identifier 901, a sender address 903, and a block hash 905. The block hash 905 may be a hash of the new sensor track data 801 together with the last valid Blockchain. In the case that the Blockchain includes a smart contract 600, an initial block may be added to refer to the smart contract 600. The new block may include encrypted sender address 903. The block may further include a transaction hash TX 907 obtained from the transaction message.

With this blockchain implementation, a private network may be established. The membership of this private network may preferably include as many computer nodes as possible (generally, the bigger the private network, the more secure the track reports are typically). In a tactical network, for instance, the number of computer nodes may be on the order of a few hundred to a few thousand. The Deployer node 301 can decide the role of these computer nodes; there might be some nodes that have the authority to create and insert new blocks while others can only receive. The network architect and cyber protection team may decide which computer nodes on the network should have what level of authority. There may also be a level of authentication that validates the identity of the nodes.

In the case of a cybersecurity attack, a node may be compromised, and such a compromised node may attempt to perform an invalid action. Alternatively, an authorized node may attempt to perform an invalid action.

Figure 10:
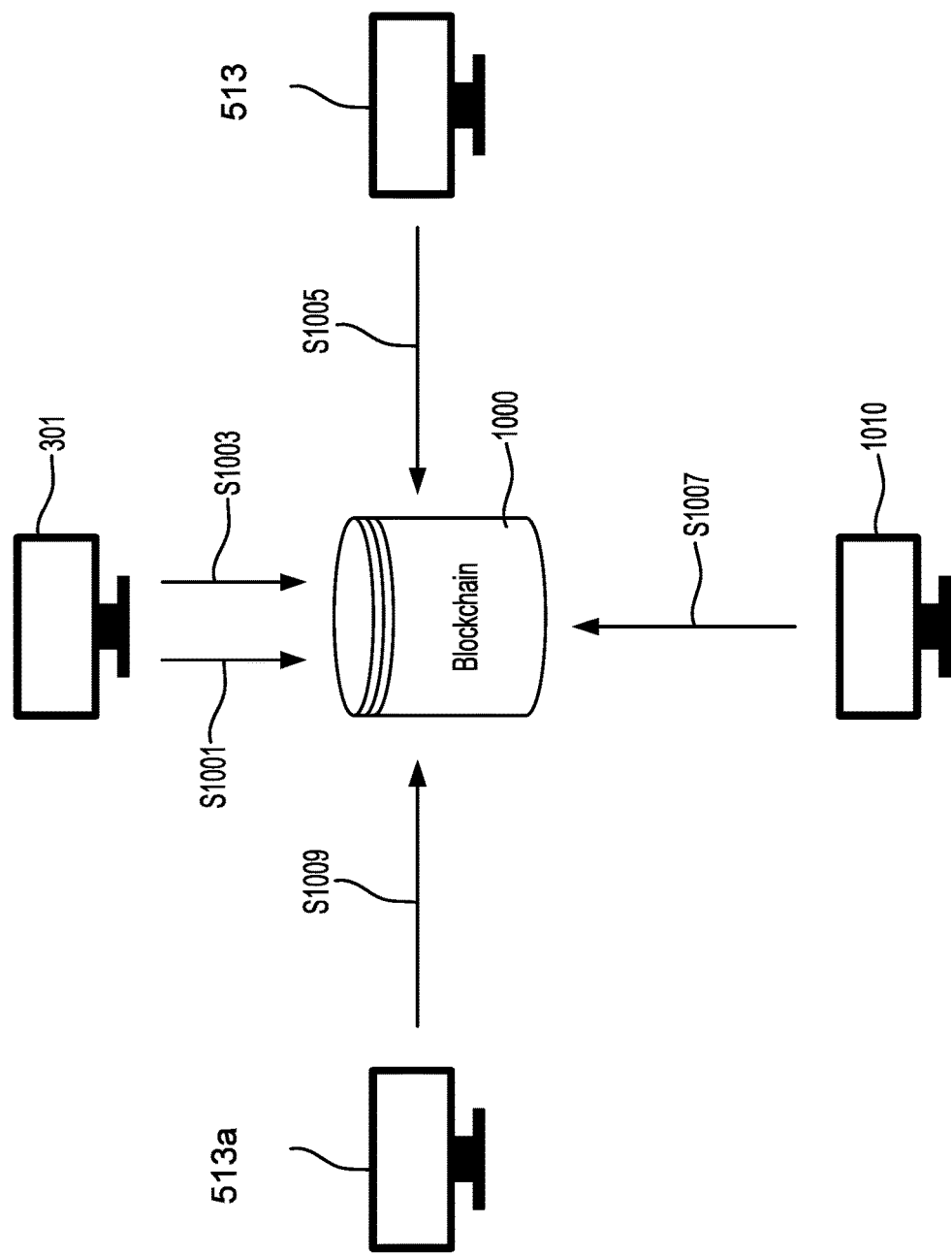
FIG. 10 is a network diagram in the case of adding a sensor node in accordance with an exemplary aspect of the disclosure.

FIG. 10 is a network diagram of an example of adding a node as a Sensor node 513 according to embodiments of the disclosed subject matter. A computer network to be used for a Blockchain may be set up by storing in memory of one computer node identifiers and addresses for each computer node and the roles of each node. Nodes that have their addresses included in the stored addresses are said to have been granted permission to participate in the Blockchain Network. The roles within the Blockchain Network (which may be private) can be set up based on the tactical system and the operational environment. In one embodiment, sensor nodes are defined in accordance with role-based rules as computer nodes that have the authority to send sensor track data by creating new blocks. To enhance security, additional role-based rules may be set. For example, certain types of sensor nodes such as a fire control tracking radar can have a higher update rate than a general long-range surveillance radar. Similarly, a radar for a Ballistic Missile Defense (BMD) mission typically produces more track updates than one designed for surface mission. Hence, behaviors may be established within the roles. In other words, if a surface radar node is producing more new blocks (i.e., more tracks at high frequency) than expected, such surface radar node might be compromised to flood the network with bogus traffic. Similarly, if a node designated as a command and control (C2) node starts to produce track and create new block, such behavior is not expected behavior. Hence, the blocks can be invalidated, and this node may be flagged as compromised. Some computer nodes may be assigned a role as a Sensor node 513 that can send data to be added to the Blockchain. Other computer nodes may be assigned a role of data display 511 that can read data in the Blockchain. At least one computer node may be a Deployer node 301 that can create and deploy a smart contract and can assign a role to a node as a Sensor node 513.

The registration process for receiving and storing addresses of permissioned nodes may be performed in a secure fashion. In some embodiments, the registration process may be performed at or by way of a computer node assigned the role of a Deployer node 301.

In S1001, a computer node designated as a Deployer node 301 may prepare and deploy a smart contract 600 as a first block in a Blockchain 1000. Although the figure shows a single Blockchain 1000, in disclosed embodiments a copy of the Blockchain 1000 can be maintained in each node that is registered in the Blockchain Network of computer nodes.

In S1003, the Deployer node 301 may then send a message to have a computer node added as a Sensor node 513. The message may include the source of the message and an address of the computer node to be added as a Sensor node. In some embodiments, the request to add a node as a Sensor node may return one of two results.

In S1005, if the smart contract 600 determines that the address of the node is an authorized node, a first result may be that the node will be added as a Sensor node 513, which periodically, for example, every 5 seconds, sends messages to add sensor track data to the Blockchain 1000.

In cases where a request message S1007 to add a node as a Sensor node is made by an unauthorized node 1010, a second result may be that execution of a function in the smart contract 600 will result in rejection of the request.

In cases where a message S1009, sent from a compromised sensor node 513*a*, to add sensor track data to the Blockchain 1000 is invalidated, for example, by performing a consensus algorithm, the Deployer node 301 will execute a function in the smart contract 600 which will reject the request to add sensor track data to the Blockchain 1000. In some embodiments, the consensus algorithm is performed in sensor nodes 513 and Deployer node 301.

Figure 11:
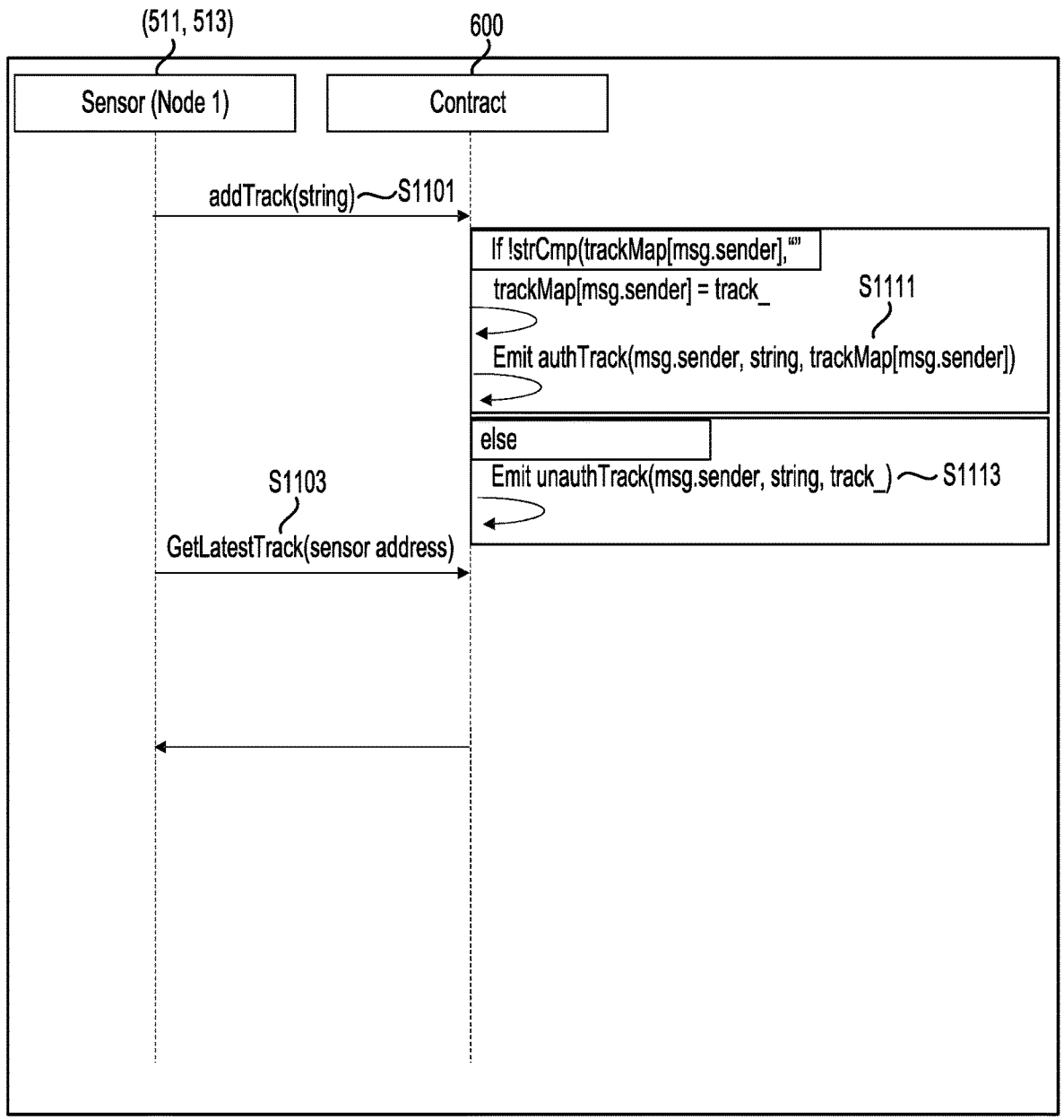
FIG. 11 is a sequence diagram for adding track data in a sensor tracking system in accordance with an exemplary aspect of the disclosure.

FIG. 11 is a sequence diagram for inserting sensor track data into a Blockchain in sensor tracking systems according to embodiments of the disclosed subject matter.

A computer node, in particular a Sensor node 513, may send a message S1101 to request to add sensor track data to the Blockchain. In some embodiments, a transaction including sensor track data undergoes a validation process including performance of a consensus algorithm. In some embodiments, both the sender address of the Sensor node 513 and the sensor track data may be validated before the new block may become part of the existing Blockchain.

In S1111, the Deployer node 301 may execute the smart contract 600 to check whether the Sender node 513 has authorization to push data to the distributed network of nodes. The address contained in the message S1101 may be checked to determine if the address is for an authorized node. Also, the Deployer node 301 may execute the smart contract 600 to broadcast the request message containing the sensor track data to other nodes in the Blockchain Network to be validated by the consensus algorithm. If execution of the smart contract 600 determines that the address is not an authorized address or the result of the consensus is negative, in S1113, the Deployer node 301 may execute the smart contract 600 to reject the request to add sensor track data to the Blockchain.

A Tactical Display node 511 may also send a message S1103 to the Deployer node to obtain the latest sensor track data from the Blockchain. In a similar manner as for adding sensor track data, if the address in the message requesting latest sensor track data is not an authorized address, execution of the smart contract may result in rejection of the request to obtain the latest sensor track data.

It may be possible for a cyber attacker to obtain a foothold into a Blockchain Network. A spoofing attack may occur when a device impersonates a node and gains the ability to send messages as a Blockchain node. This form of attack may occur in a case that an adversary uses stolen credentials to gain remote access to one or more selected nodes (often referred to as a signature spoof). Such a device may modify the packet header with a forged IP address, a checksum, and the order value. The spoofing attack may also be accomplished by intercepting a message and modifying the message and releasing the information to the intended recipient (i.e., a middle man attack). Further, a spoofing attack may also take the form of a Sensor node that attempts to add a block to the Blockchain (i.e., a fake source of data). The data itself may be altered such that the recipient may receive altered data and believe that it is sent from a node in the Blockchain. For the purpose of protecting against a spoofing attack, the block header as well as the block data is secured. As noted above, the sender node address and the block data are hashed.

Figure 12:
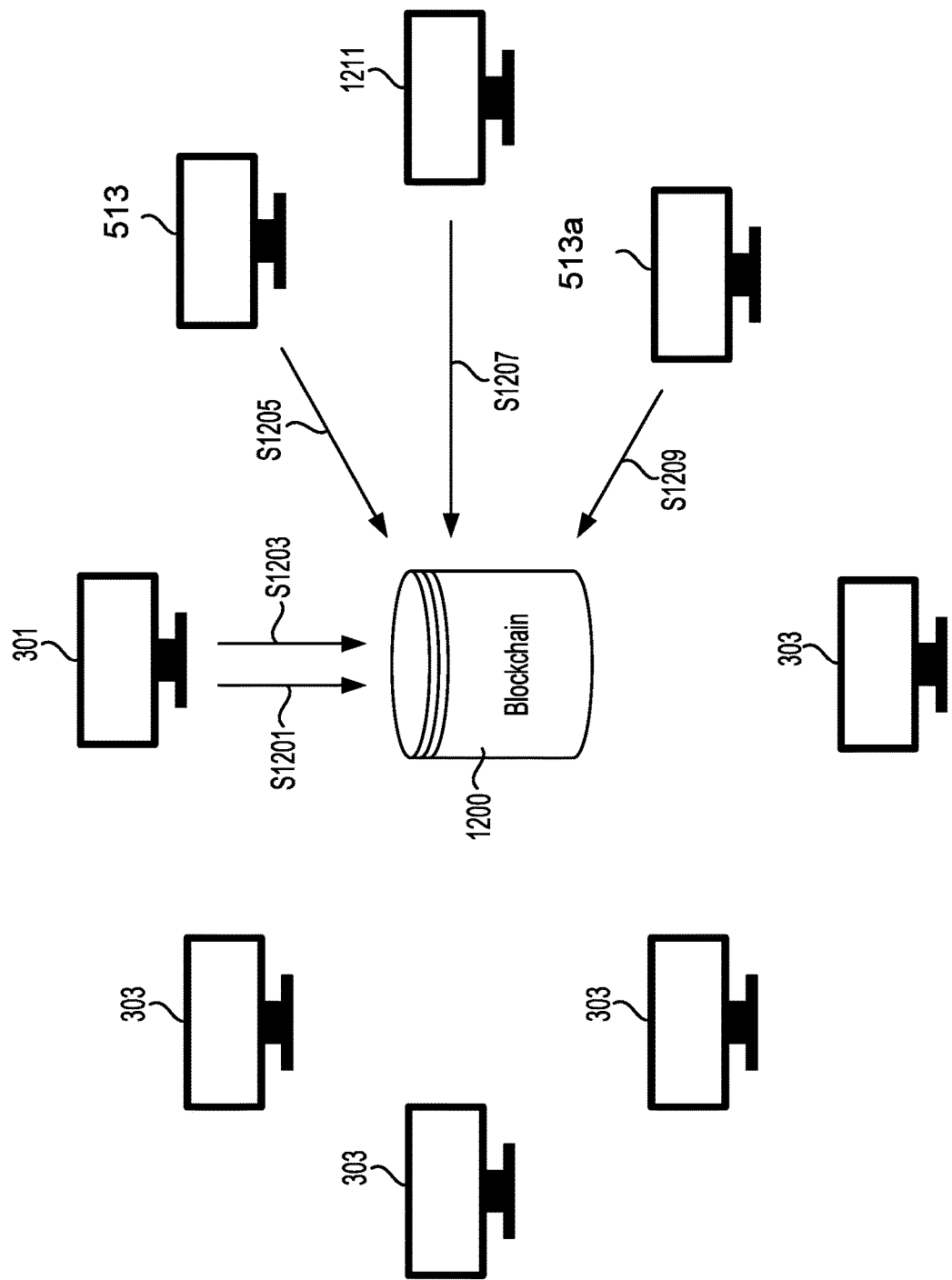
FIG. 12 is a network diagram for an example of interacting with a Blockchain in accordance with an exemplary aspect of the disclosure.

In disclosed embodiments additional measures beyond hashing can be taken to address a possible spoofing attack. FIG. 12 is a network diagram for Blockchain interaction.

In S1201, a node that has been assigned a role as a Deployer node 301 may prepare and deploy a smart contract 600 as an initial block in a Blockchain 1200.

Although the figure shows a single Blockchain 1200, in disclosed embodiments a copy of the Blockchain 1200 can be maintained in each node that is registered in the Blockchain 1200 network of nodes. Once performance of a consensus algorithm, for instance, determines that a new sensor track data block may be added to the Blockchain 1200, the consensus algorithm may add the new block to the Blockchain 1200, perform a hashing function over the appended Blockchain, and distribute the new Blockchain to all nodes in the Blockchain Network.

In S1203, the Deployer node 301 may then send a message to the smart contract 600 to have a node added as a Sensor node 513. The message may include the source address of the message and an address of the node to be validated and added as a Sensor node.

In S1205, a node 303 that has been assigned a role as a Sensor node 513 may begin to obtain sensor track data and send a message to the smart contract 600 to have the sensor track data added periodically, such as every 5 seconds.

In order to assign a node the role of a Sensor node, the node that is authorized to add a sensor must be a node assigned the role of a Deployer node 301. In S1207, a node 1211 in the Blockchain Network may send a message to the Blockchain 1200 requesting that itself be assigned the role of a Sensor node 513. In processing an add sensor message, the smart contract 600 is executed to check the address of the sender, i.e., node 1211, to ensure the address is an address of a Deployer node 301. A node that is not assigned a role as a Deployer node 301 may be detected by the smart contract 600, and the message to assign the node 1211 as a Sensor node 513 may be rejected.

Figure 13:
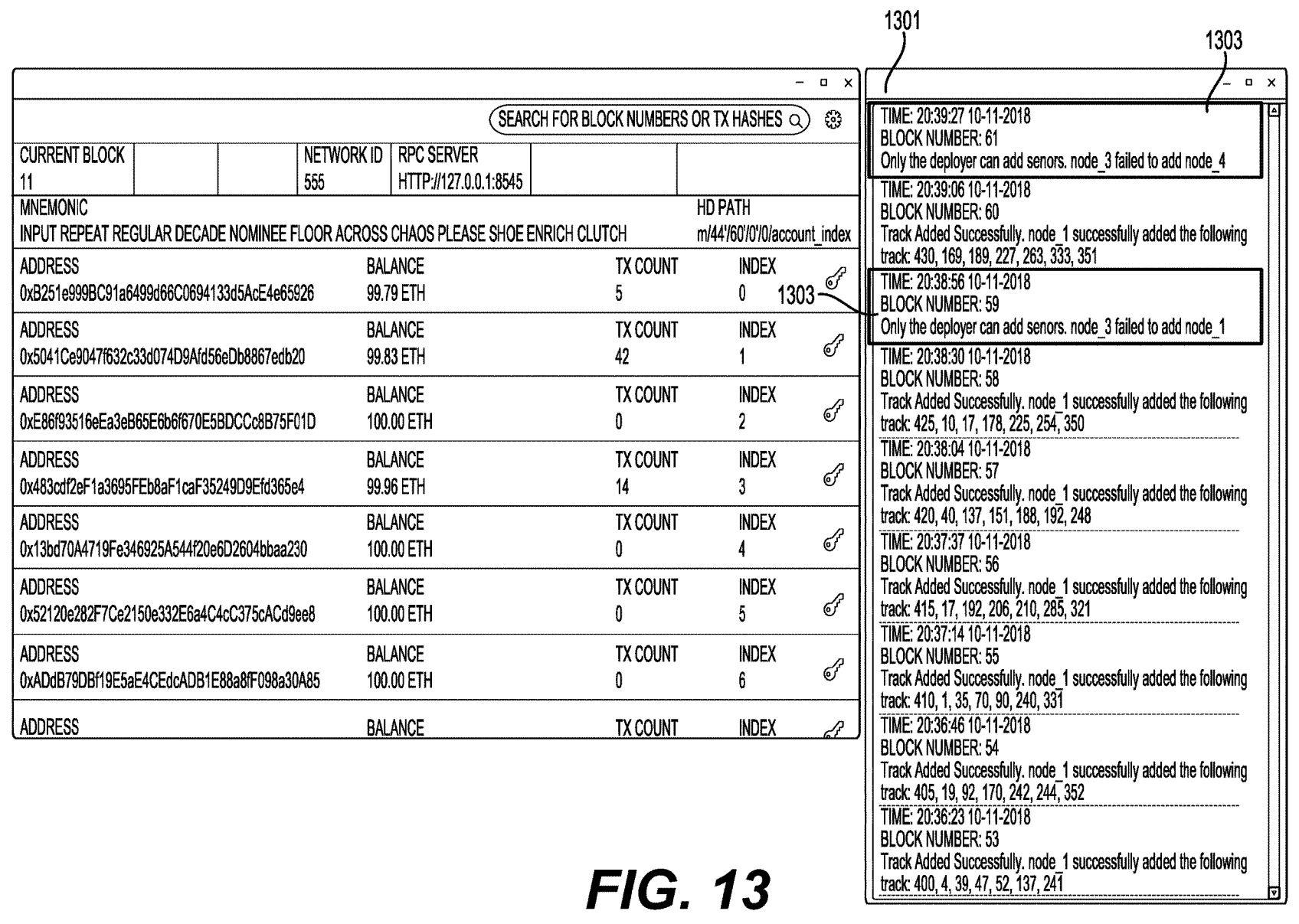

A Sensor node 513*a* may attempt to add sensor track data that has been modified (compromised). In such case, a result of performance of a consensus algorithm would be that a block cannot be created and added to the Blockchain 1200 for the new sensor track data. In S1209, the request to add sensor track data may be rejected by execution of a function in the smart contract 600. While the Blockchain 1200 (e.g., one or more algorithms thereof) may not check the legitimacy of the sensor track data, the Blockchain 1200 can include some measure to ensure the nodes 303 designated as Sensor nodes 513 are conforming to the expected normal behaviors. For example, if a surface sensor node is expected to produce sensor track data updates at low rate, but is creating new blocks at a higher volume and frequency like a BMD sensor would, the node is likely operating anomalously and should be suppressed from sending additional blocks to avoid a denial of service type of event. FIG. 13 is an exemplary display interface for a discovered spoofing attempt. Since only a Deployer node 301 can add a node 303 as a Sensor node 513, a log 1301 will be recorded to show a time stamped logged record 1303 for an attempt to add a node as a Sensor node 513 by a node that does not have the role of a Deployer node 301.

Numerous modifications and variations of the present invention are possible in light of the above teachings. It is therefore to be understood that within the scope of the appended claims, the invention may be practiced otherwise than as specifically described herein.

The invention claimed is:

1. A computer network of interconnected computer nodes, comprising:
   a plurality of the interconnected computer nodes; and
   one of the computer nodes assigned a role of a deployer node, the deployer node being configured to create and execute a rule-based block and to assign other of the computer nodes a role of sensor node or a role of display node,
   wherein the deployer node maintains addresses of the sensor nodes and the display nodes,
   wherein the computer nodes assigned the role of the sensor node are configured to add sensor track data to create linked blocks,
   wherein the computer nodes assigned the role of the display node are configured to read the sensor track data in the linked blocks,
   wherein the rule-based block includes a sensor add rule which when executed checks that only the computer node assigned the role of the deployer node is able to assign the role of sensor node to said other of the computer nodes, and
   wherein the rule-based block includes a sensor track data add rule which when executed checks that only each of the computer node or nodes assigned the role of sensor node is able to request to add new sensor track data to create the linked blocks.

2. The computer network of claim 1, wherein the computer nodes perform a validation check to validate each said new sensor track data to be added to create the linked blocks.

3. The computer network of claim 2,
   wherein the plurality of computer nodes are interconnected as a mesh in which each of the computer nodes is connected to all of the other computer nodes, and
   wherein the new sensor track data to be added to create the linked blocks is broadcast by the deployer node to all of the computer nodes in the network, which perform the validation check.

4. The computer network of claim 1, wherein each of the computer node or nodes assigned the role of sensor node sends a message to insert the new sensor track data to the rule-based block having a contract address, the message including both an encrypted address of a sender node and the new sensor track data encrypted.

5. The computer network of claim 4, wherein one of the computer nodes performs a hash over the linked blocks including the new sensor track data, and stores the hash in a new block linked to the linked blocks.

6. The computer network of claim 1, wherein execution of the rule-based block rejects a message to assign the role of sensor node to a computer node whose address is not a preexisting address stored in the computer network.

7. The computer network of claim 1, wherein execution of the rule-based block rejects a message to add new sensor track data when an address of the sensor node in the message does not match the address of any of the computer node or nodes that has been assigned the role of sensor node.

8. The computer network of claim 1, wherein the deployer node is further configured to send a message to remove the role of sensor node from at least one of the computer nodes assigned the role of sensor node.

9. The computer network of claim 8, wherein execution of the rule-based block rejects the message to remove the role of sensor node from said at least one of the computer nodes when the message is not from a computer node that is assigned the role of the deployer node.

10. The computer network of claim 1, wherein execution of the rule-based block posts a log event to an event logger for each rejected message to assign the role of sensor node, to add new sensor track data, or to remove the role of sensor node.

11. A method in a computer network of interconnected computer nodes, the method comprising:
    assigning one of the computer nodes a role of a deployer node;
    creating, by the deployer node, a rule-based block;
    assigning, by the deployer node, others of the computer nodes a role of sensor node or a role of display node;
    storing, by the deployer node, addresses of the sensor nodes and the display nodes;
    adding, by the sensor nodes, sensor track data to create linked blocks;
    reading, by the display nodes, the sensor track data in the linked blocks;
    checking, by execution of a sensor add rule of the rule-based block, that only the computer node assigned the role of the deployer node is able to assign the role of sensor node to said others of the computer nodes; and
    checking, by execution of a track data add rule of the rule-based block, that only each of the computer node or nodes assigned the role of sensor node is able to request to add new sensor track data to create the linked blocks.

12. The method of claim 11, further comprising:
    performing, by the computer nodes, a validation check to validate each said new sensor track data to be added to create the linked blocks.

13. The method of claim 12, wherein the plurality of computer nodes are interconnected as a mesh in which each of the computer nodes is connected to all of the other computer nodes, further comprising:
    broadcasting, by the deployer node, to all of the computer nodes in the network the new sensor track data to be added to create the linked blocks; and
    performing, by the computer nodes, the validation check.

14. The method of claim 11, further comprising:
    sending, by the sensor node, a message to insert new sensor track data to the rule-based block having a contract address, the message including both an address of a sender node and the new sensor track data encrypted.

15. The method of claim 14, further comprising:
    performing, by one of the computer nodes, a hash over the linked blocks including the new sensor track data; and
    storing the hash in a new block linked to the linked blocks.

16. The method of claim 11, further comprising:
    rejecting, by execution of the rule-based block, a message to assign the role of sensor node to a computer node whose address is not a preexisting address stored in the computer network.

17. The method of claim 11, further comprising:
    rejecting, by execution of the rule-based block, a message to add new sensor track data when an address of the sensor node in the message does not match the address of any of the computer node or nodes that has been assigned the role of sensor node.

18. The method of claim 11, further comprising:
    sending, by the deployer node, a message to remove the role of sensor node from at least one of the computer nodes that has been assigned the role of sensor node.

19. The method of claim 11, further comprising:
rejecting, by execution of the rule-based block, a message to remove the role of sensor node from at least one of the computer nodes when the message is not from a computer node that is assigned the role of the deployer node.

20. The method of claim 11, further comprising:
posting, by execution of the rule-based block, a log event to an event logger for each rejected message to assign the role of sensor node, to add new sensor track data, or to remove the role of sensor node.

\* \* \* \* \*